Sept. 15, 1964     E. L. SCHEIDENHELM     3,148,494
HARVESTER REEL TINE ASSEMBLY
Filed March 9, 1962     2 Sheets-Sheet 1
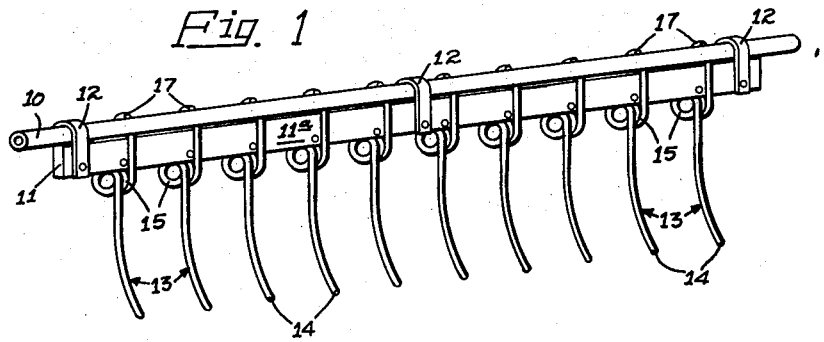
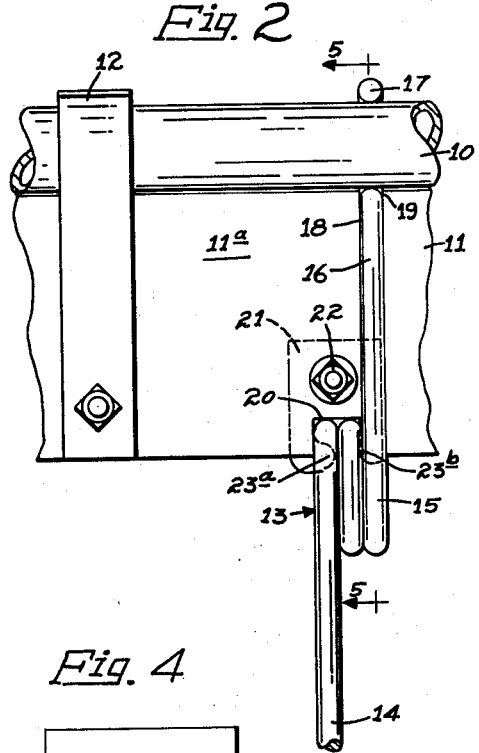
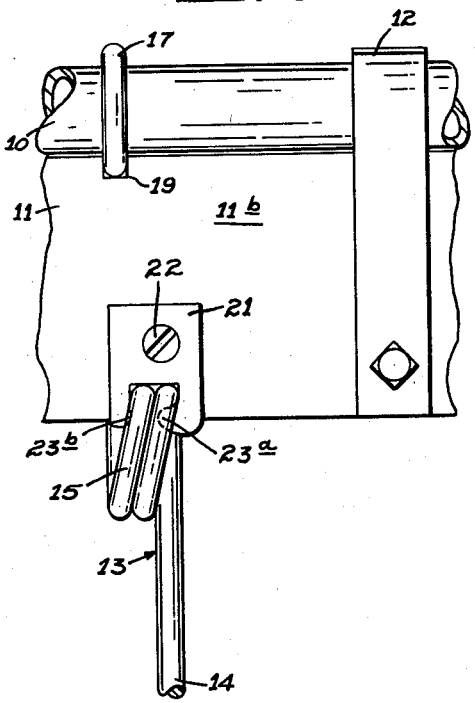
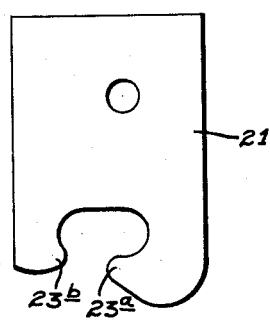
INVENTOR.
EARL L. SCHEIDENHELM
BY *Wells & St. John*
ATTYS.

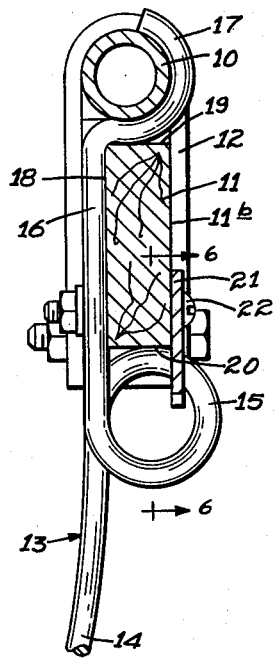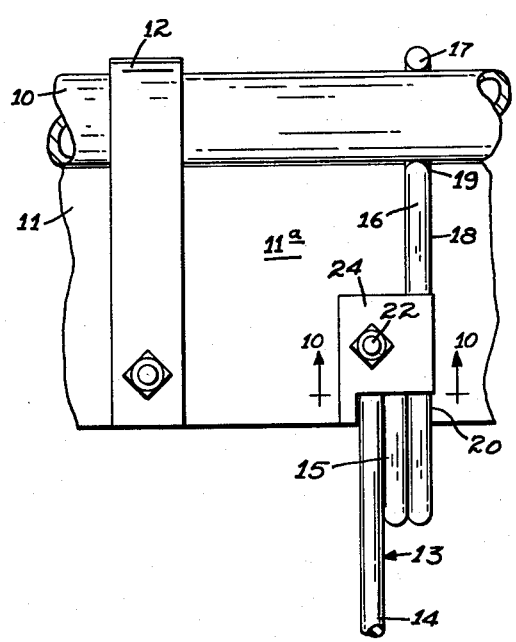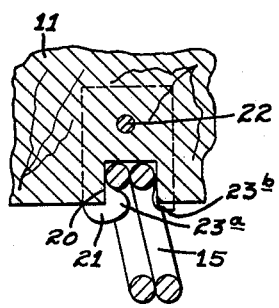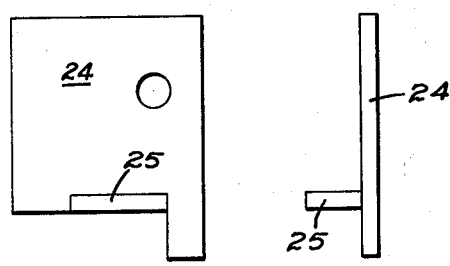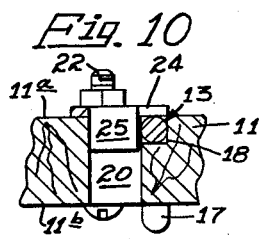

United States Patent Office 3,148,494
Patented Sept. 15, 1964

3,148,494
HARVESTER REEL TINE ASSEMBLY
Earl L. Scheidenhelm, Mendota, Ill., assignor to
Horace D. Hume, Mendota, Ill.
Filed Mar. 9, 1962, Ser. No. 178,700
3 Claims. (Cl. 56—400)

This invention relates to a novel tine assembly for use on harvester reels.

This invention is concerned with an improved tine assembly for use on a harvester reel. A typical reel is described in detail in the patent to Horace D. Hume, No. 2,644,289, granted July 7, 1953, for Harvester Reel. Such reels are commonly used on combines and in conjunction with other harvesting equipment. Basically these reels rotate about a transverse axis at the front of the machine and bring a series of bats and associated projecting tines into contact with the crop being harvested so as to force the crop toward a cutter bar which severs it from the roots. A basic problem inherent in such structures is the mounting of the individual tines on the bat with which it is associated. The bats are normally quite rugged and capable of long usage since they do not come into close contact with the ground or protruding objects such as rocks. The downwardly projecting tines, on the other hand, are in precarious positions and due to their very use are subject to damage and breakage. Therefore one must mount each tine in an individual fashion and in a manner which allows for easy and quick replacement in the field. At the same time each tine must be securely positioned against motion relative to the bat in order to fully utilize the inherent flexible nature of the tine. A secure tine mounting is absolutely necessary to the proper use of the harvester reel.

It is a first object of this invention to provide a harvester reel tine assembly which can be readily adapted to an existing machine without major modification of the existing structure. In order to adapt this invention to existing reels of the type illustrated in the patent cited above, it is necessary to replace only the tines and bats.

A second object of this invention is to provide a tine mounting which is extremely simple in structure and which can be readily assembled in the field without special tools. The mounting of the tines is self evident from their very appearance.

Another object of this invention is to provide a tine assembly in which the tine is securely held against rotation about the axis of the bat shaft on which it is mounted, but is free to flex along its length without damage or breakage.

These and further objects will be evident from a study of the attached drawings and the following detailed description which describes a preferred form of my invention and includes alternative forms of holding clips associated therewith. The illustrations given in the drawings are not exhaustive of the possibilities envisioned in this invention and therefore are not to limit or restrict the scope of my invention except as it is defined in the claims.

In the drawings:

FIGURE 1 is a perspective view of a bat shaft and bat assembly showing the harvester reel tine assembly as fully constructed;

FIGURE 2 is a front view of a bat mounted on a bat shaft and showing the mounting of a single tine thereon;

FIGURE 3 is a back view of the assembly illustrated in FIGURE 2;

FIGURE 4 is an elevational view of a first form of clip utilized in this invention.

FIGURE 5 is a sectional view taken along line 5—5 in FIGURE 2;

FIGURE 6 is a sectional view taken along line 6—6 in FIGURE 5;

FIGURE 7 is a view similar to FIGURE 2 illustrating the use of a second form of clip.

FIGURE 8 is an enlarged rear elevational view of the clip illustrated in FIGURE 7;

FIGURE 9 is an end view of the clip as seen in FIGURE 8; and

FIGURE 10 is a sectional view taken along line 10—10 in FIGURE 7.

Referring now to the drawings, a first form of my invention is illustrated in FIGURES 1 through 6. In FIGURE 1 a complete harvester reel bat and tine assembly is shown. This assembly includes a bat shaft 10 and an adjacent bat 11. The bat 11 is fixed to the shaft 10 by means of U-shaped harnesses 12 which are normally welded to shaft 10 and bolted to the replaceable bat 11. In many instances the bat 11 is made of wood, however any suitable material may be utilized for this purpose. The bat shaft 10 is adapted to be mounted on a reel in the manner indicated in the above cited patent and is maintained in a controlled angular position relative to the ground during the rotation of the reel. This control maintains the bat 11 in the proper position so as to facilitate the forcing of crops toward the machine's cutter bars.

Mounted along the transversely positioned bat 11 are a plurality of identical tines 13. Each tine 13 has a conventional lower portion 14 which extends downwardly from the bat 11. Each tine 13 also has a conventional coil 15 which is wrapped about a horizontal transverse axis and which is formed integrally at the top end of the lower portion 14. Coil 15 allows the lower portion 14 of the tine 13 to flex when in use. The tine 13 is completed by an upper section 16 extending upwardly from the coil 15 and terminating in a hooked upper end 17.

The manner by which this novel tine is secured to bat 11 constitutes the basic concept of this invention. Each bat 11 is provided with a series of spaced grooves 18 on the front face 11a. The grooves 18 extend perpendicularly to the transverse length of the individual bats 11. Each groove 18 is designed to receive within it the upper section 16 of a tine 13. Basically, the upper section 16 is held within the groove 18 and the hooked upper end 17 of the tine 13 is engaged about the bracket side of the associated bat shaft 10. The bat 11 is further provided with a top groove 19 which provides clearance for the hooked upper end 17 of the tine 13 and also includes a wider groove 20 at its bottom surface which partially receives the coil 15. Thus the grooves 18, 19 and 20 serve to accurately position the tines 13 and prevent their transverse movement relative to the bat 11.

In order to prevent motion of the individual tines 13 about the longitudinal central axis of the bat shaft 10 on which they are mounted, there is provided a clip consisting of a simple plate 21. The first form of this plate 21 is shown in detail in FIGURE 4. It is a flat metal plate which is adapted to be secured to the bat 11 by means of a bolt or rivet 22. At its lower end the plate 21 is provided with inwardly directed extensions 23a and 23b. The shape of these extensions may best be seen in FIGURE 4. The larger extension 23a serves to facilitate entry of the coil 15 between the extensions. The plate 21 may thus be readily mounted on a tine coil 15 by first inserting the coil 15 between the main body of the plate 21 and the larger extensions 23a and by then twisting the plate 21 so as to bring the smaller extension 23b to the position illustrated in FIGURE 3.

In operation the maintenance of the instant reel tine assembly is extremely simple. Should a tine 13 be damaged or broken during use, it may be readily replaced in the field without the use of any special tools or skills. One need only release the bolt or rivet 22 and remove the plate 21 from engagement with the coil 15. One can then pivot the tine 13 about the axis of bat shaft 10 and disengage the hooked upper end 17 to thereby release the entire tine 13. Installation of a new tine 13 is merely the converse of these steps and should be obvious from the above description and the accompanying drawings. The first form of my clip plate 21 is shown on the back surface 11b of the bat 11. The insertion of tine 13 in the grooves 18, 19 and 20 stabilizes the tine 13 in a direction parallel to the axis of the bat shaft 10. It further stabilizes the tine 13 in an axis about the upper section 16 of the tine itself and thereby prevents the tine 13 from being twisted about its own axis, due both to the interrelation of the coil 15 with bat 11 and the corresponding interrelation of the hooked upper end 17 and the bat shaft 10. The grooves 18, 19 and 20 thereby strengthen the mounting of the tine 13 and minimize the chances of the tine 13 being displaced by outside forces during a harvesting operation.

A second form of clip is illustrated in FIGURES 7 through 10. This form of clip is used with the same bat shaft 10, bat 11 and tine 13 as previously described. Identical grooves 18, 19 and 20 are formed in the bat 11 and the tine 13 is mounted therein in identically the same fashion. The only difference between the embodiment illustrated in these figures and that previously described lies in the configuration of the clip plate 24. In this instance the clip plate 24 is provided with an inwardly directed tab 25 which is of the same width as the groove 20 that receives the coil 15. The clip plate 24 is mounted on the front surface 11a of bat 11 and overlaps a portion of the upper section 16 of the tine 13. The tab 25 rests against the upper surface of the groove 20 and serves to prevent movement of the clip plate 24 about the axis of the bolt or rivet 22 which secures the plate 24 to bat 11. The clip plate 24 therefore prevents rotation of the tine 13 about the axis of bat shaft 10 and yet allows the tine 13 to flex freely in its normal operation. The installation and removal of the tine 13 is basically the same as that previously described and should be obvious from the drawings presented herewith.

The procedure of looping the front of the tine partially around the back of the bat shaft 10 has the advantage of allowing the tine 13 to flex relatively freely between the bat shaft 10 and the holding clip plate 21 or 24 when a load is placed in the normal load direction on the bottom of the tine lower portion 14. At the same time it is impossible to pull the tine 13 away from bat 11 in a downward direction even if the plate 21 or 24 is slightly damaged. It is extremely important to notice that the plates 21 and 24 merely hold the tine 13 from pivoting about the axis of the bat shaft 10. They do not materially affect the necessary positioning of tine 13 relative to the shaft 10 and bat 11.

I have described and illustrated a preferred form of this invention and have included two alternative forms of clip plates usable therewith. Obviously many other types of clip plates could be used so long as they overlap a portion of the tine 13 and maintain the tine 13 in its necessary position within the grooves 18, 19 and 20. For these reasons, I do not intend this invention to be restricted or limited by the above disclosure except as the invention is defined in the claims immediately following.

Having thus described my invention, I claim:

1. A tine assembly for a harvester reel having a plurality of collateral bat shafts mounted thereon, comprising:
    a plurality of wooden bats mounted individually along the lengths of said bat shafts, each of said bats being provided with laterally spaced grooves along the front face thereof extending perpendicularly to the bat lengths;
    a plurality of identical tines mounted on each bat, each tine including a lower portion adapted to engage crops being harvested, an integral coil having a transverse axis and formed at the top end of said lower portion, an upper section fitted within a groove on the front bat face, and a hooked upper end wrapped partially about the back surface of the bat shaft associated therewith;
    and clip means fixed to each bat and engaging each tine adapted to prevent rotation of each tine about the longitudinal axis of the bat shaft engaged thereby.

2. An assembly as defined in claim 1 wherein the bats are further provided with recesses cut along their lower edges adapted to partially receive the coils of the tines mounted thereon;
    said clip means comprising a plurality of flat plates securely fastened to the bat and individually overlapping a part of the upper section of a tine, each plate having inwardly directed extensions at the lower end thereof adapted to project within the tine coil when assembled.

3. An assembly as defined in claim 1 wherein the bats are further provided with recesses cut along their lower edges adapted to partially receive the coils of the tines mounted thereon;
    said clip means comprising a plurality of flat plates securely fastened to the bat and individually overlapping a part of the upper section of a tine, each plate having a bent tab adapted to rest against the upper edge of the adjacent coil recess on the bat.

References Cited in the file of this patent

UNITED STATES PATENTS

| | | |
|---|---|---|
| 169,853 | Sharp | Nov. 9, 1875 |
| 363,665 | Michaelis | May 24, 1887 |
| 375,892 | Patten | Jan. 3, 1888 |
| 2,380,173 | Harrison | July 10, 1945 |
| 2,603,936 | Keene | July 22, 1952 |
| 2,608,045 | Keene | Aug. 26, 1952 |
| 2,748,556 | Summers et al. | June 5, 1956 |
| 2,856,748 | Keene | Oct. 21, 1958 |
| 2,994,181 | Scheidenhelm | Aug. 1, 1961 |